United States Patent
Miyahara et al.

(10) Patent No.: US 12,134,565 B2
(45) Date of Patent: Nov. 5, 2024

(54) CRYSTALLINE MATERIAL AND MEMBRANE COMPLEX

(71) Applicant: NGK INSULATORS, LTD., Nagoya (JP)

(72) Inventors: Makoto Miyahara, Tajimi (JP); Kenichi Noda, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 669 days.

(21) Appl. No.: 17/305,674

(22) Filed: Jul. 13, 2021

(65) Prior Publication Data

US 2021/0340016 A1 Nov. 4, 2021

Related U.S. Application Data

(63) Continuation of application No. PCT/JP2020/005241, filed on Feb. 12, 2020.

(30) Foreign Application Priority Data

Mar. 8, 2019 (JP) .................................. 2019-043080

(51) Int. Cl.
*C01B 37/04* (2006.01)
*B01D 53/22* (2006.01)
(Continued)

(52) U.S. Cl.
CPC .......... *C01B 37/04* (2013.01); *B01D 69/1213* (2022.08); *B01D 69/147* (2013.01);
(Continued)

(58) Field of Classification Search
CPC ....... C01B 37/04; C01B 37/065; C01B 37/08; B01D 71/0281; B01D 69/1213;
(Continued)

(56) References Cited

U.S. PATENT DOCUMENTS 5,095,163 A * 3/1992 Barger ...................... C07C 1/20
585/640
11,766,667 B2 * 9/2023 Onozuka ................. C01B 39/48
502/64

(Continued)

FOREIGN PATENT DOCUMENTS

WO 2016/121887 A1 8/2016
WO 2016/121889 A1 8/2016

OTHER PUBLICATIONS

English translation of the International Preliminary Report on Patentability (Chapter I) dated Sep. 23, 2021 (Application No. PCT/JP2020/005241).

(Continued)

*Primary Examiner* — Patricia L. Hailey
(74) *Attorney, Agent, or Firm* — BURR PATENT LAW, PLLC (57) ABSTRACT

A crystalline material contains oxygen, aluminum and phosphorus, and has powder X-ray diffraction peaks shown below. When the peak at $2\theta=14.17\pm0.2°$ is used as the reference peak and the intensity of the reference peak is set to 100, for example, the relative intensity of the peak at $2\theta=8.65\pm0.2°$ is 1 to 15. The relative intensity of the peak at $2\theta=9.99\pm0.2°$ is 1 to 15. The relative intensity of the peak at $2\theta=16.52\pm0.2°$ is 5 to 80. The relative intensity of the peak at $2\theta=17.37\pm0.2°$ is 1 to 15. The relative intensity of the peak at $2\theta=21.81\pm0.2°$ is 10 to 80.

5 Claims, 5 Drawing Sheets

(51) Int. Cl.
    *B01D 69/12* (2006.01)
    *B01D 69/14* (2006.01)
    *B01D 71/02* (2006.01)
    *B01J 20/02* (2006.01)
    *B01J 20/18* (2006.01)
    *B01J 20/28* (2006.01)
    *C01B 37/06* (2006.01)
    *C01B 37/08* (2006.01)

(52) U.S. Cl.
CPC ...... *B01D 71/0281* (2022.08); *B01J 20/0248* (2013.01); *B01J 20/0292* (2013.01); *B01J 20/18* (2013.01); *B01J 20/28035* (2013.01); *C01B 37/065* (2013.01); *C01B 37/08* (2013.01); *B01D 53/228* (2013.01); *C01P 2002/72* (2013.01)

(58) Field of Classification Search
CPC .. B01D 69/147; B01D 53/228; B01J 20/0248; B01J 20/0292; B01J 20/18; B01J 20/28035; B01J 29/04; B01J 29/06; B01J 29/061; B01J 29/85; C01P 2002/72; C01P 2004/61
USPC ...... 502/4, 64; 423/702, 704–708, 713, 716, 423/718
See application file for complete search history.

(56) References Cited

U.S. PATENT DOCUMENTS

| | | | |
|---|---|---|---|
| 2010/0010272 A1* | 1/2010 | Ivanova | C07C 41/09 568/698 |
| 2011/0318262 A1* | 12/2011 | Zones | C01B 39/48 423/706 |
| 2011/0318263 A1* | 12/2011 | Zones | B01J 29/70 423/718 |
| 2015/0025291 A1* | 1/2015 | Weston | C07C 4/06 585/722 |
| 2017/0291135 A1 | 10/2017 | Noda | |
| 2017/0296980 A1 | 10/2017 | Noda | |

OTHER PUBLICATIONS

Maria Castro, et al., "Molecular Modeling, Multinuclear NMR, and Diffraction Studies in the Templated Synthesis and Characterization of the Aluminophosphate Molecular Sieve STA-2," *J. Phys. Chem. C*, 2010, vol. 114, pp. 12698-12710.

Graham W. Noble, et al., "The Templated Synthesis and Structure Determination by Synchrotron Microcrystal Diffraction of the Novel Small Pore Magnesium Aluminophosphate STA-2," *Journal of Chemical Society, Dalton Transactions*, 1997, pp. 4485-4490.

International Search Report and Written Opinion (Application No. PCT/JP2020/005241) dated Apr. 14, 2020.

* cited by examiner

CRYSTALLINE MATERIAL AND MEMBRANE COMPLEX

CROSS-REFERENCE TO RELATED APPLICATION

The present application is a continuation application of International Application No. PCT/JP2020/005241 filed on Feb. 12, 2020, which claims priority to Japanese Patent Application No. 2019-043080 filed on Mar. 8, 2019. The contents of these applications are incorporated herein by reference in their entirety.

TECHNICAL FIELD

The present invention relates to a crystalline material and a membrane complex.

BACKGROUND ART

Various structures of zeolite are known, and one of the structures of zeolite is an SAT-type. With respect to the SAT-type zeolite, for example, "The templated synthesis and structure determination by synchrotron microcrystal diffraction of the novel small pore magnesium aluminophosphate STA-2" by Graham W. Noble and other two members, Journal of Chemical Society, Dalton Transactions 1997, pages 4485-4490 (Document 1), and "Molecular Modeling, Multinuclear NMR, and Diffraction Studies in the Templated Synthesis and Characterization of the Aluminophosphate Molecular Sieve STA-2" by Maria Castro and other ten members, Journal of Physics and Chemistry C 2010, volume 114, pages 12698-12710 disclose the method of producing the powder.

Meanwhile, the crystalline materials such as zeolite have been studied for use or put into practical use in various applications such as specific gas separation or molecular adsorption. Therefore, in order to expand the choice of crystalline materials having desired properties, there is always a demand for crystalline materials having a novel structure.

SUMMARY OF INVENTION

The present invention is intended for a crystalline material, and it is an object of the present invention to provide a crystalline material having a novel structure.

The crystalline material according to a preferred embodiment of the present invention contains oxygen, aluminum and phosphorus, and has powder X-ray diffraction peaks shown in the table below.

TABLE 1

| 2 θ (°) | d (nm) | Relative Intensity |
|---|---|---|
| 8.65 ± 0.2 | 1.022 | 1-15 |
| 9.99 ± 0.2 | 0.885 | 1-15 |
| 14.17 ± 0.2 | 0.625 | 100 |
| 16.52 ± 0.2 | 0.537 | 5-80 |
| 17.37 ± 0.2 | 0.511 | 1-15 |
| 21.81 ± 0.2 | 0.407 | 10-80 |
| 22.44 ± 0.2 | 0.396 | 2-15 |
| 24.66 ± 0.2 | 0.361 | 15-70 |
| 26.11 ± 0.2 | 0.341 | 10-80 |
| 28.56 ± 0.2 | 0.313 | 5-40 |
| 29.80 ± 0.2 | 0.300 | 3-30 |
| 33.17 ± 0.3 | 0.270 | 1-20 |

TABLE 1-continued

| 2 θ (°) | d (nm) | Relative Intensity |
|---|---|---|
| 34.93 ± 0.3 | 0.257 | 1-15 |
| 36.21 ± 0.3 | 0.248 | 2-15 |
| 39.02 ± 0.3 | 0.231 | 1-10 |
| 43.44 ± 0.3 | 0.208 | 1-10 |

According to the present invention, it is possible to provide a crystalline material having a novel structure.

Preferably, the crystalline material is powder having an average particle diameter of 0.01 to 10 μm.

Preferably, the crystalline material contains no structure-directing agent.

Preferably, the crystalline material further contains at least one of silicon, magnesium, zinc, titanium, cobalt, copper, iron and boron.

The present invention is also intended for a membrane complex. The membrane complex according to a preferred embodiment of the present invention includes a support, and a membrane containing the above crystalline material and provided on the support.

These and other objects, features, aspects and advantages of the present invention will become more apparent from the following detailed description of the present invention when taken in conjunction with the accompanying drawings.

DESCRIPTION OF EMBODIMENTS

A crystalline material according to the present invention (hereinafter, referred to as the "present crystalline material") contains oxygen (O), aluminum (Al) and phosphorus (P), and has powder X-ray diffraction peaks shown in Table 2.

TABLE 2

| 2 θ (°) | d (nm) | Relative Intensity |
|---|---|---|
| 8.65 ± 0.2 | 1.022 | 1-15 |
| 9.99 ± 0.2 | 0.885 | 1-15 |
| 14.17 ± 0.2 | 0.625 | 100 |
| 16.52 ± 0.2 | 0.537 | 5-80 |
| 17.37 ± 0.2 | 0.511 | 1-15 |
| 21.81 ± 0.2 | 0.407 | 10-80 |
| 22.44 ± 0.2 | 0.396 | 2-15 |
| 24.66 ± 0.2 | 0.361 | 15-70 |

TABLE 2-continued

| 2 θ (°) | d (nm) | Relative Intensity |
|---|---|---|
| 26.11 ± 0.2 | 0.341 | 10-80 |
| 28.56 ± 0.2 | 0.313 | 5-40 |
| 29.80 ± 0.2 | 0.300 | 3-30 |
| 33.17 ± 0.3 | 0.270 | 1-20 |
| 34.93 ± 0.3 | 0.257 | 1-15 |
| 36.21 ± 0.3 | 0.248 | 2-15 |
| 39.02 ± 0.3 | 0.231 | 1-10 |
| 43.44 ± 0.3 | 0.208 | 1-10 |

In Table 2, the diffraction angles 2θ of the powder X-ray diffraction peaks are values obtained when CuKα ray is used as a radiation source. Further, when the peak at 2θ=14.17±0.2° is used as the reference peak and the intensity of the reference peak is set to 100, the relative value of the intensity of each peak is shown as the relative intensity (the same applies to other tables). The height excluding the bottom line in the powder X-ray diffraction pattern, that is, the height excluding the background noise component is used as the relative intensity of the peak. The bottom line in the powder X-ray diffraction pattern is determined by, for example, the Sonneveld-Visser method or the spline interpolation method.

In the present embodiment, the present crystalline material having the powder X-ray diffraction peaks shown in Table 2 is produced by subjecting the zeolite having the structural code "SAT" assigned by the International Zeolite Association to the treatment described later. The powder X-ray diffraction pattern shown in Table 2 is different from the powder X-ray diffraction pattern of the SAT-type zeolite (for example, see (b) of FIG. 1 of the above Document 1), and in the present crystalline material, for example, the relative intensity of the peak at 2θ=8.65±0.2° is smaller than that of SAT-type zeolite. Therefore, the present crystalline material has a novel structure different from that of SAT-type zeolite. The crystalline material may have a peak other than the powder X-ray diffraction peaks shown in Table 2. Such a peak may occur due to inclusion of other substances or the like.

An example of the SAT-type zeolite used to produce the present crystalline material is AlPO-type zeolite in which atoms (T-atoms) located at the center of an oxygen tetrahedron ($TO_4$) constituting the zeolite include Al and P. SAPO-type zeolite in which T-atoms include Si (silicon), Al, and P, MAPSO-type zeolite in which T-atoms include magnesium (Mg), Si, Al, and P, ZnAPSO-type zeolite in which T-atoms include zinc (Zn), Si, Al, and P, or the like may be used. Some of the T-atoms may be replaced by other elements such as titanium (Ti) and boron (B).

The present crystalline material produced from the SAT-type zeolite is a porous substance similarly to the SAT-type zeolite and is considered to be zeolite. The crystalline material also typically has a composition similar to that of the SAT-type zeolite. Therefore, the present crystalline material contains oxygen, aluminum and phosphorus. In addition, the crystalline material may further contain at least one of silicon, magnesium, zinc, titanium, cobalt, copper, iron and boron. This makes it possible to change the pore diameter and adsorption characteristics of the crystalline material.

The phosphorus/aluminum molar ratio (i.e., value obtained by dividing the number of moles of phosphorus by the number of moles of aluminum; the same applies hereinafter) in the present crystalline material is preferably 0.5 to 4, more preferably 0.7 to 2. The phosphorus/aluminum ratio in the crystalline material can be adjusted by adjusting, for example, the mixing ratio of an aluminum source and a phosphorus source in the starting material solution described later (the same applies to the ratio of other elements).

In the present crystalline material, it is preferable that the structure-directing agent (hereinafter, referred to as an "SDA") used at the time of synthesizing the SAT-type zeolite is removed. That is, the preferred crystalline material contains no SDA. As a result, pores are appropriately provided in the crystalline material. For confirmation of the presence or absence of SDA, for example, heat generated gas mass spectrometry (TPD-MS) can be used. When the value obtained by dividing the mass of $CO_2$ gas when the crystalline material is heated to 200 to 900° C. or higher in a He atmosphere by the mass of the crystalline material is, for example, 1000 wtppm or less, it is considered that the crystalline material contains no SDA. In one example, it is confirmed whether the SDA is present or absent by analyzing the gas generated by heating the crystalline material at a heating rate of 10° C./min while performing He flow (50 ml/min), using a gas chromatograph mass spectrometer (GC/MS QP2010Plus) manufactured by Shimadzu Corporation. Depending on the application of the crystalline material, the crystalline material may contain an SDA. The crystalline material may contain an alkali metal. The alkali metal is, for example, sodium (Na) or potassium (K).

The average pore diameter of the present crystalline material is 1 nm or less.

In one example, the present crystalline material is produced as powder. The average particle diameter of the powder of the crystalline material is, for example, 0.01 to 10 μm, preferably 0.05 to 5 μm, and more preferably 0.1 to 1 μm. The average particle diameter of the powder is the median diameter (D50) in the particle diameter distribution obtained by the laser scattering method. As described later, the crystalline material may be produced as a membrane.

Figure 1:
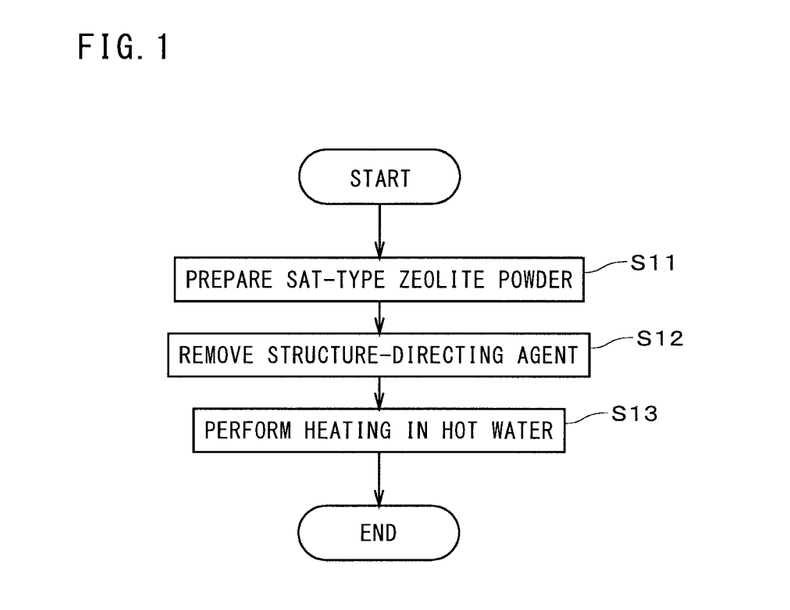
FIG. 1 is a flowchart showing a flow for producing powder of a crystalline material.

FIG. 1 is a flowchart showing a flow for producing powder of a crystalline material having the powder X-ray diffraction peaks shown in Table 2. In this production example, first, SAT-type zeolite powder (crystals) is synthesized and prepared (Step S11). In the synthesis of the SAT-type zeolite powder, a starting material solution is prepared by, for example, dissolving an aluminum source, a phosphorus source, an SDA, and the like in a solvent. The composition of the starting material solution is, for example, 1 $Al_2O_3$:1 $P_2O_5$:0.8 SDA:200 $H_2O$. As the solvent for the starting material solution, alcohol such as ethanol may be used other than water. As the aluminum source, for example, sodium aluminate, aluminum hydroxide, aluminum alkoxide, alumina sol or the like can be used. As the phosphorus source, for example, phosphoric acid, phosphoric acid ester, aluminum phosphate or the like can be used. The SDA contained in the starting material solution is, for example, an organic substance. As the SDA, for example, hydroxylated 1,4-diazabicyclo[2.2.2]octane-C4-diquat or the like can be used.

Subsequently, hydrothermal synthesis for the starting material solution is performed. The temperature during the hydrothermal synthesis is, for example, 120 to 200° C. The hydrothermal synthesis time is, for example, 5 to 240 hours. After the hydrothermal synthesis is completed, the obtained crystals are washed with pure water. Then, by drying the washed crystals, SAT-type zeolite powder is produced. The SAT-type zeolite powder may be prepared by other methods.

After the SAT-type zeolite powder is prepared, a heat treatment is performed on the powder under an oxidizing gas atmosphere, to thereby combustion-remove the SDA in the powder (Step S12). Preferably, the SDA is almost completely removed. The heating temperature for removing the SDA is, for example, from 350 to 700° C. The heating time is, for example, from 10 to 200 hours. The oxidizing gas atmosphere is an atmosphere containing oxygen and, for example, the air.

After that, the SAT-type zeolite powder is mixed with hot water and heated (Step S13). The temperature of the hot water is, for example, 100 to 300° C., preferably 100 to 200° C. The heating time is, for example, 10 to 100 hours, preferably 20 to 50 hours. After the heating in the hot water is completed, the obtained crystals are washed with pure water. Then, by drying the washed crystals, the crystalline material having the powder X-ray diffraction peaks shown in Table 2 is obtained.

Next, examples of production of powder of the above crystalline material will be described.

Example 1

Aluminum alkoxide (aluminum isopropoxide), 85% phosphoric acid, and hydroxylated 1,4-diazabicyclo[2.2.2]octane-C4-diquat as the aluminum source, the phosphorus source, and the SDA (structure-directing agent), respectively, were dissolved in pure water to prepare a starting material solution having a composition of 1 $Al_2O_3$:1 $P_2O_5$: 0.8 SDA:200 $H_2O$. This starting material solution was hydrothermally synthesized at 190° C. for 50 hours. The crystals obtained by the hydrothermal synthesis were collected, thoroughly washed with pure water, and then completely dried at 100° C. As a result of X-ray diffraction measurement, the obtained crystals were confirmed to be crystals of SAT-type zeolite. The crystals were heat-treated at 500° C. for 20 hours to combustion-remove the SDA, and heat-treated in hot water at 150° C. for 15 hours. The obtained crystals were collected, thoroughly washed with pure water, and then completely dried at 100° C. As a result, powder of a crystalline material was obtained.

Figure 2:
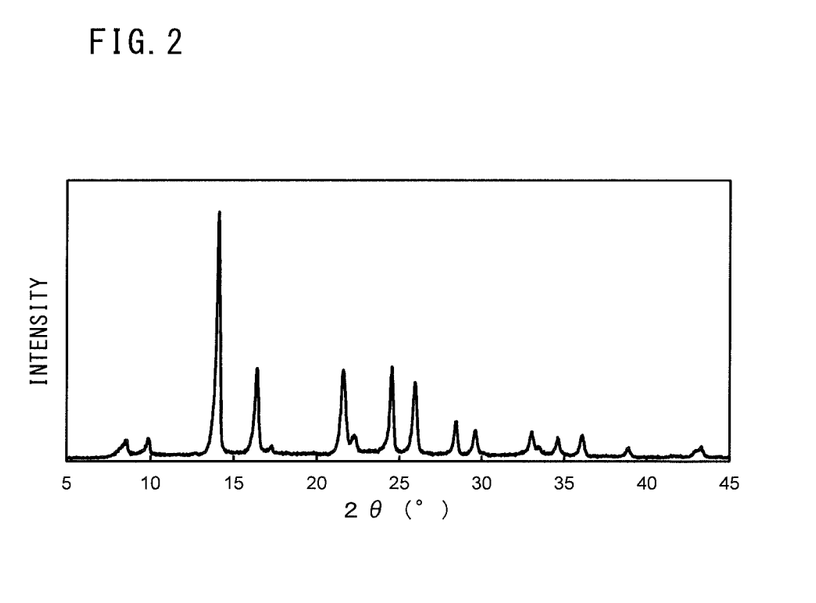
FIG. 2 is a view showing a powder X-ray diffraction pattern of crystalline material.

FIG. 2 is a view showing a powder X-ray diffraction pattern of the crystalline material of Example 1. The measurement of the X-ray diffraction pattern was carried out by densely packing the measurement powder in a sample holder having a sufficient depth. In the powder X-ray diffraction measurement, an X-ray diffractometer manufactured by Rigaku Corporation (product name:MiniFlex600) was used. In the powder X-ray diffraction measurement, the tube voltage was 40 kV, the tube current was 15 mA, the scanning speed was 0.5°/min, and the scanning step was 0.02°. The divergence slit was 1.25°, the scattering slit was 1.25°, the receiving slit was 0.3 mm, the incident solar slit was 5.0°, and the light-receiving solar slit was 5.0°. A monochromator was not used, and as a CuKβ line filter, used was a nickel foil having a thickness of 0.015 mm. The relative intensity of each peak of the powder X-ray diffraction pattern of FIG. 2 is shown in Table 3. The relative intensity of each peak in Table 3 is included in the range of relative intensity shown in Table 2, and the crystalline material of Example 1 had the powder X-ray diffraction peaks shown in Table 2.

TABLE 3

| 2 θ (°) | d (nm) | Relative Intensity |
| --- | --- | --- |
| 8.65 ± 0.2 | 1.022 | 9 |
| 9.99 ± 0.2 | 0.885 | 7 |
| 14.17 ± 0.2 | 0.625 | 100 |

TABLE 3-continued

| 2 θ (°) | d (nm) | Relative Intensity |
| --- | --- | --- |
| 16.52 ± 0.2 | 0.537 | 13 |
| 17.37 ± 0.2 | 0.511 | 5 |
| 21.81 ± 0.2 | 0.407 | 17 |
| 22.44 ± 0.2 | 0.396 | 7 |
| 24.66 ± 0.2 | 0.361 | 34 |
| 26.11 ± 0.2 | 0.341 | 22 |
| 28.56 ± 0.2 | 0.313 | 15 |
| 29.80 ± 0.2 | 0.300 | 9 |
| 33.17 ± 0.3 | 0.270 | 2 |
| 34.93 ± 0.3 | 0.257 | 5 |
| 36.21 ± 0.3 | 0.248 | 9 |
| 39.02 ± 0.3 | 0.231 | 4 |
| 43.44 ± 0.3 | 0.208 | 5 |

Example 2

Figure 3:
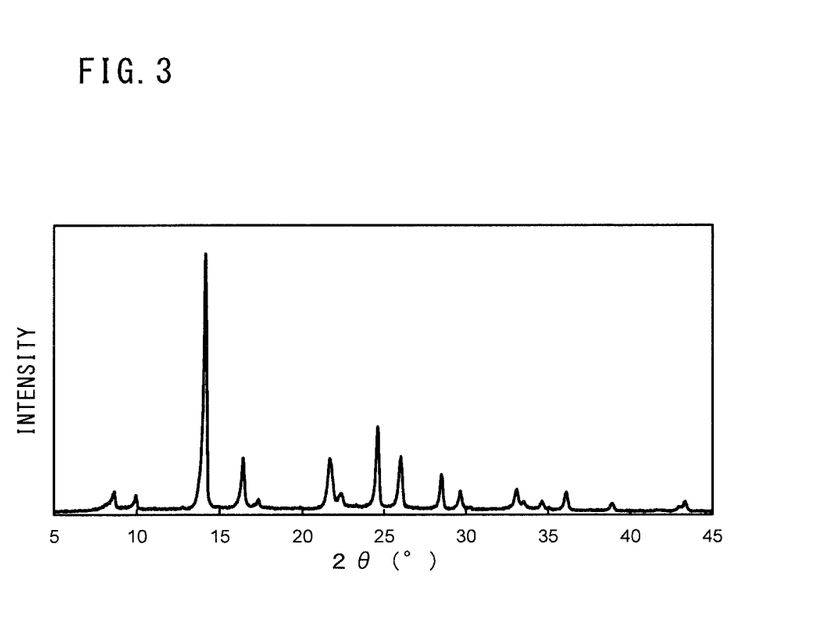
FIG. 3 is a view showing a powder X-ray diffraction pattern of crystalline material.

Powder of a crystalline material was obtained in the same manner as in Example 1 except that alumina sol was used as the aluminum source. FIG. 3 is a view showing a powder X-ray diffraction pattern of the crystalline material of Example 2. The relative intensity of each peak of the powder X-ray diffraction pattern of FIG. 3 is shown in Table 4. The relative intensity of each peak in Table 4 is included in the range of relative intensity shown in Table 2, and the crystalline material of Example 2 had the powder X-ray diffraction peaks shown in Table 2.

TABLE 4

| 2 θ (°) | d (nm) | Relative Intensity |
| --- | --- | --- |
| 8.65 ± 0.2 | 1.022 | 9 |
| 9.99 ± 0.2 | 0.885 | 9 |
| 14.17 ± 0.2 | 0.625 | 100 |
| 16.52 ± 0.2 | 0.537 | 37 |
| 17.37 ± 0.2 | 0.511 | 6 |
| 21.81 ± 0.2 | 0.407 | 18 |
| 22.44 ± 0.2 | 0.396 | 11 |
| 24.66 ± 0.2 | 0.361 | 38 |
| 26.11 ± 0.2 | 0.341 | 32 |
| 28.56 ± 0.2 | 0.313 | 16 |
| 29.80 ± 0.2 | 0.300 | 13 |
| 33.17 ± 0.3 | 0.270 | 3 |
| 34.93 ± 0.3 | 0.257 | 3 |
| 36.21 ± 0.3 | 0.248 | 11 |
| 39.02 ± 0.3 | 0.231 | 6 |
| 43.44 ± 0.3 | 0.208 | 6 |

Example 3

Figure 4:
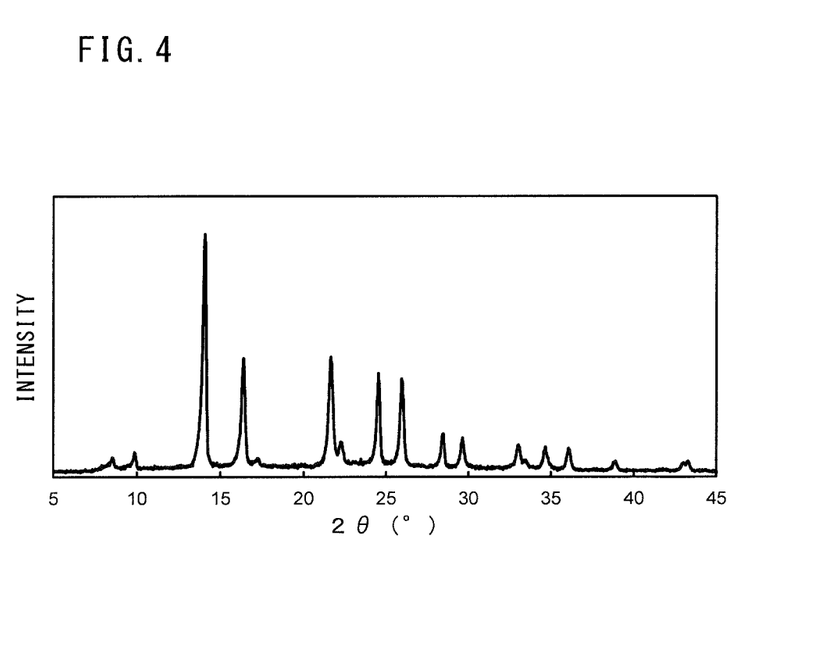
FIG. 4 is a view showing a powder X-ray diffraction pattern of crystalline material.

Powder of a crystalline material was obtained in the same manner as in Example 1 except that magnesium acetate was added to the starting material solution. FIG. 4 is a view showing a powder X-ray diffraction pattern of the crystalline material of Example 3. The relative intensity of each peak of the powder X-ray diffraction pattern of FIG. 4 is shown in Table 5. The relative intensity of each peak in Table 5 is included in the range of relative intensity shown in Table 2, and the crystalline material of Example 3 had the powder X-ray diffraction peaks shown in Table 2.

TABLE 5

| 2 θ (°) | d (nm) | Relative Intensity |
|---|---|---|
| 8.65 ± 0.2 | 1.022 | 8 |
| 9.99 ± 0.2 | 0.885 | 10 |
| 14.17 ± 0.2 | 0.625 | 100 |
| 16.52 ± 0.2 | 0.537 | 49 |
| 17.37 ± 0.2 | 0.511 | 8 |
| 21.81 ± 0.2 | 0.407 | 49 |
| 22.44 ± 0.2 | 0.396 | 14 |
| 24.66 ± 0.2 | 0.361 | 43 |
| 26.11 ± 0.2 | 0.341 | 40 |
| 28.56 ± 0.2 | 0.313 | 18 |
| 29.80 ± 0.2 | 0.300 | 16 |
| 33.17 ± 0.3 | 0.270 | 4 |
| 34.93 ± 0.3 | 0.257 | 12 |
| 36.21 ± 0.3 | 0.248 | 12 |
| 39.02 ± 0.3 | 0.231 | 6 |
| 43.44 ± 0.3 | 0.208 | 6 |

Figure 5:
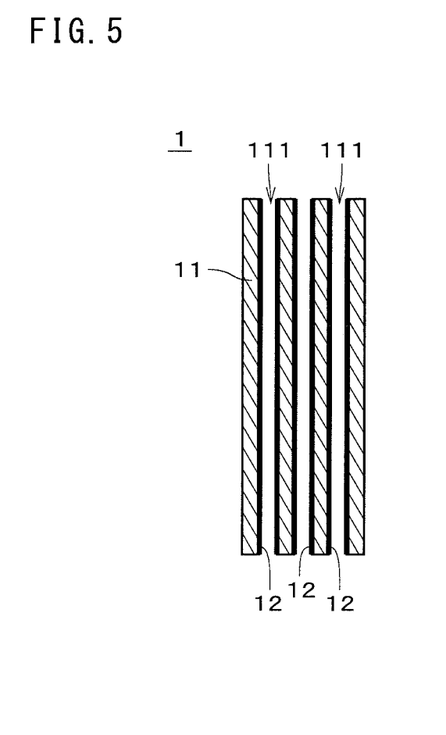
FIG. 5 is a cross-sectional view showing a membrane complex.
Figure 6:
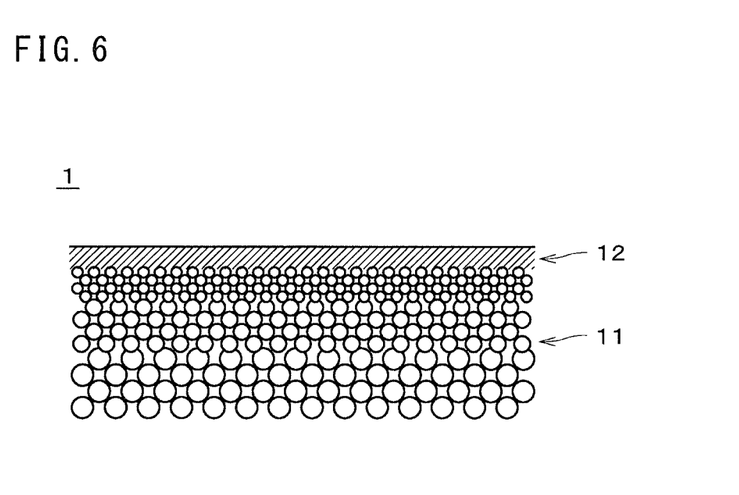
FIG. 6 is a cross-sectional view enlargedly showing part of the membrane complex.

Next, a membrane complex including a polycrystalline membrane of the present crystalline material will be described. FIG. 5 is a cross-sectional view showing a membrane complex 1. FIG. 6 is a cross-sectional view enlargedly showing part of the membrane complex 1. The membrane complex 1 includes a porous support 11 and a polycrystalline membrane 12 provided on the support 11. The polycrystalline membrane in the present preferred embodiment is a membrane obtained by forming the above crystalline material on a surface of the support 11 in a form of polycrystalline membrane. In FIG. 5, the polycrystalline membrane 12 is shown by a heavy line. In FIG. 6, the polycrystalline membrane 12 is hatched. Further, in FIG. 6, the thickness of the polycrystalline membrane 12 is shown larger than the actual thickness.

The support 11 is a porous member that gas and liquid can permeate. In the example shown in FIG. 5, the support 11 is a monolith-type support having an integrally and continuously molded columnar main body provided with a plurality of through holes 111 extending in a longitudinal direction (i.e., an up-and-down direction in FIG. 5). In the example shown in FIG. 5, the support 11 has a substantially columnar shape. A cross section perpendicular to the longitudinal direction of each of the through holes 111 (i.e., cells) is, for example, substantially circular. In FIG. 5, the diameter of each through hole 111 is larger than the actual diameter, and the number of through holes 111 is smaller than the actual number. The polycrystalline membrane 12 is provided over an inner peripheral surface of each through hole 111, covering substantially the entire inner peripheral surface of the through hole 111.

The length of the support 11 (i.e., the length in the up-and-down direction of FIG. 5) is, for example, 10 cm to 200 cm. The outer diameter of the support 11 is, for example, 0.5 cm to 30 cm. The center distance between adjacent through holes 111 is, for example, 0.3 mm to 10 mm. The surface roughness (Ra) of the support 11 is, for example, 0.1 μm to 5.0 μm, and preferably 0.2 μm to 2.0 μm. Further, the shape of the support 11 may be, for example, honeycomb-like, flat plate-like, tubular, cylindrical, columnar, polygonal prismatic, or the like. When the support 11 has a tubular or cylindrical shape, the thickness of the support 11 is, for example, 0.1 mm to 10 mm.

As the material for the support 11, various materials (for example, ceramics or a metal) may be adopted only if the materials ensure chemical stability in the process step of forming the polycrystalline membrane 12 on the surface thereof. In the present preferred embodiment, the support 11 is formed of a ceramic sintered body. Examples of the ceramic sintered body which is selected as a material for the support 11 include alumina, silica, mullite, zirconia, titania, yttria, silicon nitride, silicon carbide, and the like. In the present preferred embodiment, the support 11 contains at least one kind of alumina, silica, and mullite.

The support 11 may contain an inorganic binder. As the inorganic binder, at least one of titania, mullite, easily sinterable alumina, silica, glass frit, a clay mineral, and easily sinterable cordierite can be used.

The average pore diameter of the support 11 is, for example, 0.01 μm to 70 μm, and preferably 0.05 μm to 25 μm. The average pore diameter of the support 11 in the vicinity of the surface on which the polycrystalline membrane 12 is formed is 0.01 μm to 1 μm, and preferably 0.05 μm to 0.5 μm. Regarding the pore diameter distribution of the entire support 11 including the surface and the inside thereof, D5 is, for example, 0.01 μm to 50 μm, D50 is, for example, 0.05 μm to 70 μm, and D95 is, for example, 0.1 μm to 2000 μm. The porosity of the support 11 in the vicinity of the surface on which the polycrystalline membrane 12 is formed is, for example, 25% to 50%.

The support 11 has, for example, a multilayer structure in which a plurality of layers with different average pore diameters are layered in a thickness direction. The average pore diameter and the sintered particle diameter in a surface layer including the surface on which the polycrystalline membrane 12 is formed are smaller than those in layers other than the surface layer. The average pore diameter in the surface layer of the support 11 is, for example, 0.01 μm to 1 μm, and preferably 0.05 μm to 0.5 μm. When the support 11 has a multilayer structure, the materials for the respective layers can be those described above. The materials for the plurality of layers constituting the multilayer structure may be the same as or different from one another.

The polycrystalline membrane 12 is a porous membrane having small pores. The polycrystalline membrane 12 can be used as a separation membrane for separating a specific substance from a mixed substance in which a plurality of types of substances are mixed, by using a molecular sieving function. As compared with the specific substance, any one of the other substances is harder to permeate the polycrystalline membrane 12. In other words, the permeance of any other substance through the polycrystalline membrane 12 is smaller than that of the above specific substance.

The thickness of the polycrystalline membrane 12 is, for example, 0.05 μm to 30 μm, preferably 0.1 μm to 20 μm, and further preferably 0.5 μm to 10 μm. When the thickness of the polycrystalline membrane 12 is increased, the separation performance increases. When the thickness of the polycrystalline membrane 12 is reduced, the permeance increases. The surface roughness (Ra) of the polycrystalline membrane 12 is, for example, 5 μm or less, preferably 2 μm or less, more preferably 1 μm or less, and further preferably 0.5 μm or less.

The average pore diameter of the polycrystalline membrane 12 made of the present crystalline material is, for example, 1 nm or less, similarly to the powder of the crystalline material. The average pore diameter of the polycrystalline membrane 12 is preferably not smaller than 0.2 nm and not larger than 0.8 nm, more preferably not smaller than 0.3 nm and not larger than 0.5 nm, and further preferably not smaller than 0.3 nm and not larger than 0.4 nm. The average pore diameter of the polycrystalline membrane 12 is smaller than that of the support 11 in the vicinity of the surface on which the polycrystalline membrane 12 is formed.

The permeation rate (permeance) of $CO_2$ through the polycrystalline membrane 12 at 20° C. to 400° C. is, for example, 100 nmol/m²·s·Pa or more. Further, the ratio (permeance ratio) of the permeance of $CO_2$ through the polycrystalline membrane 12 to the permeance (leakage) of $CH_4$ at 20° C. to 400° C. is, for example, 100 or more. The permeance and the permeance ratio are those in a case where the partial pressure difference of $CO_2$ between the supply side and the permeation side of the polycrystalline membrane 12 is 1.5 MPa.

Figure 7:
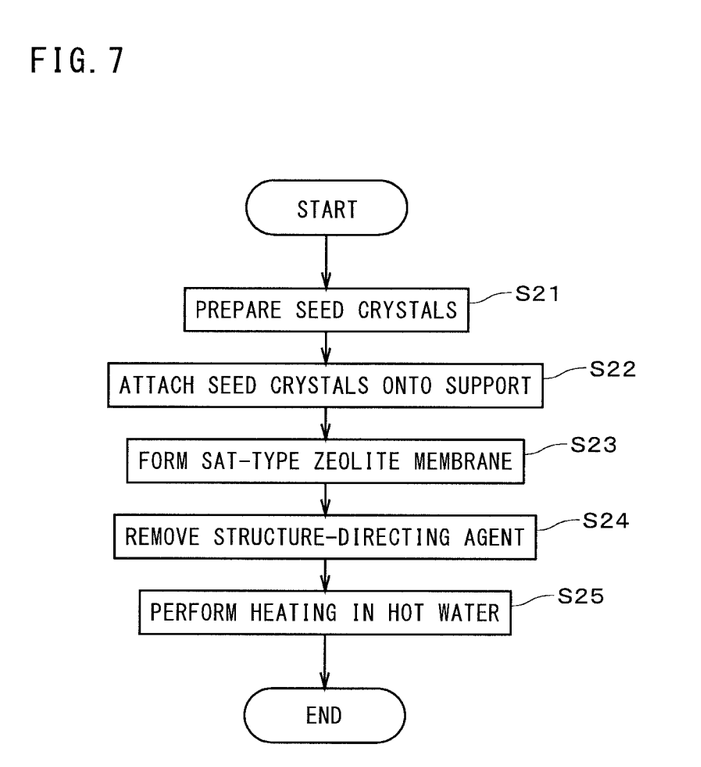
FIG. 7 is a flowchart showing a flow for producing the membrane complex.

FIG. 7 is a flowchart showing a flow for producing the membrane complex 1. In the production of the membrane complex 1, first, seed crystals to be used for producing the polycrystalline membrane 12 are prepared (Step S21). For example, SAT-type zeolite powder is synthesized by hydrothermal synthesis as in Step S11 of FIG. 1, and the seed crystals are acquired from the zeolite powder. The zeolite powder itself may be used as the seed crystals, or may be processed by pulverization or the like, to thereby acquire the seed crystals.

Subsequently, the porous support 11 is immersed in a solution in which the seed crystals are dispersed, and the seed crystals are thereby attached onto the support 11 (Step S22). Alternatively, the solution in which the seed crystals are dispersed is brought into contact with a portion on the support 11 where the polycrystalline membrane 12 is to be formed, and the seed crystals are thereby attached onto the support 11. A seed crystals attachment support is thereby produced. The seed crystals may be attached onto the support 11 by any other method.

The support 11 with the seed crystals attached thereon is immersed in a starting material solution. The starting material solution is prepared by dissolving an aluminum source, a phosphorus source, an SDA, and the like in a solvent in the same manner as in Step S11. Then, the SAT-type zeolite is grown through hydrothermal synthesis using the seed crystals as nuclei so as to form the SAT-type zeolite membrane (the zeolite polycrystalline membrane) on the support 11 (Step S23). The temperature during the hydrothermal synthesis is, for example, 120 to 200° C. The hydrothermal synthesis time is, for example, 5 to 100 hours. At this time, the composition of the SAT-type zeolite membrane can be adjusted by adjusting, for example, the mixing ratio of the aluminum source and the phosphorus source in the starting material solution. After the hydrothermal synthesis is completed, the support 11 and the zeolite membrane are washed with pure water, and then dried.

Subsequently, in the same manner as in step S12, a heat treatment is performed on the support 11 and the zeolite membrane under an oxidizing gas atmosphere, to thereby combustion-remove the SDA in the zeolite membrane (Step S24). This causes micropores in the zeolite membrane to pierce the zeolite membrane. Preferably, the SDA is almost completely removed. The heating temperature for removing the SDA is, for example, from 350 to 700° C. The heating time is, for example, from 10 to 200 hours.

After that, the support 11 and the zeolite membrane is immersed in hot water and heated (Step S25). The temperature of the hot water is, for example, 100 to 300° C., preferably 100 to 200° C. The heating time is, for example, 10 to 100 hours, preferably 20 to 50 hours. After the heating in the hot water is completed, the support 11 and the polycrystalline membrane are washed with pure water, and then dried, for example, at 100° C. As a result, the membrane complex 1 including the support 11 and the polycrystalline membrane 12 is obtained. The polycrystalline membrane 12 is made of the crystalline material having the powder X-ray diffraction peaks shown in Table 2.

Figure 8:
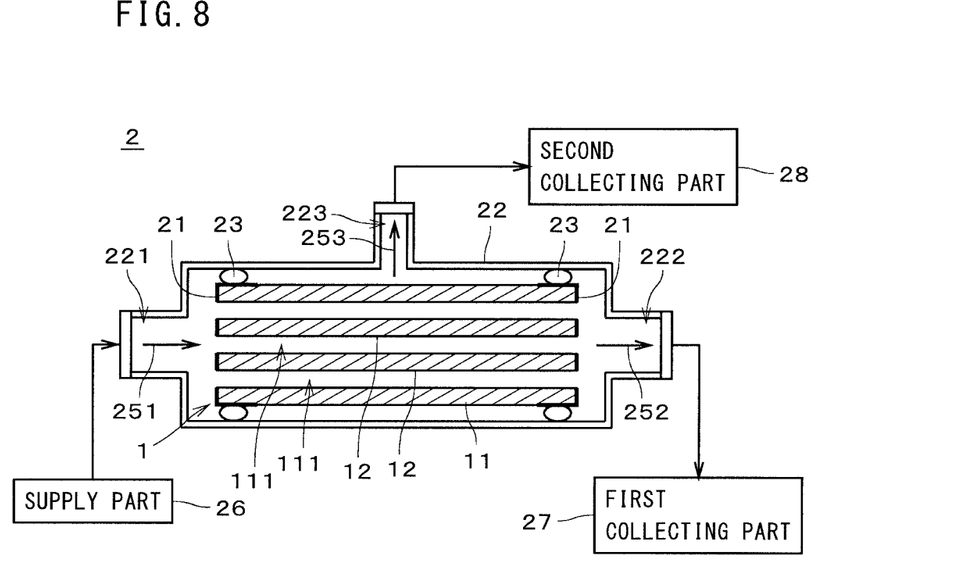
FIG. 8 is a diagram showing a separation apparatus.
Figure 9:
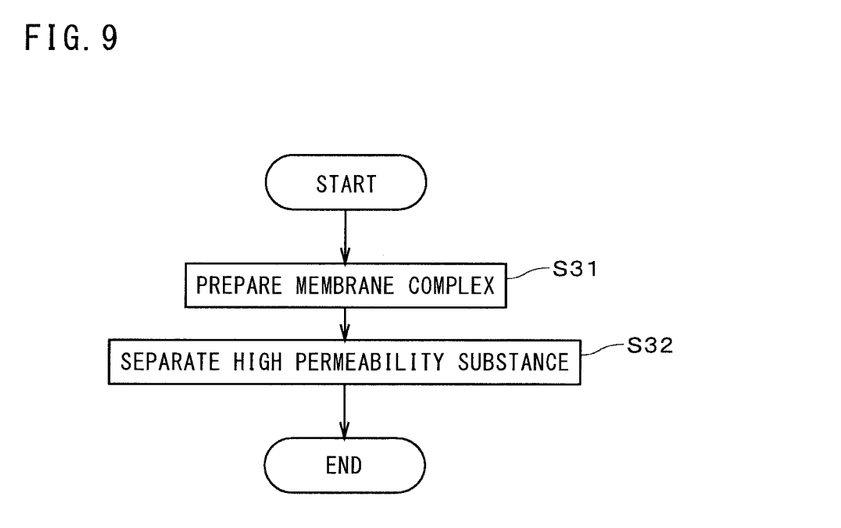
FIG. 9 is a flowchart showing a flow for separating a mixed substance by the separation apparatus.

Next, with reference to FIGS. 8 and 9, separation of a mixed substance using the membrane complex 1 will be described. FIG. 8 is a diagram showing a separation apparatus 2. FIG. 9 is a flowchart showing a flow for separation of a mixed substance by the separation apparatus 2.

In the separation apparatus 2, a mixed substance containing a plurality of types of fluids (i.e., gases or liquids) is supplied to the membrane complex 1, and a substance with high permeability in the mixed substance is caused to permeate the membrane complex 1, to be thereby separated from the mixed substance. Separation in the separation apparatus 2 may be performed, for example, in order to extract a substance with high permeability from a mixed substance, or in order to concentrate a substance with low permeability.

The mixed substance (i.e., mixed fluid) may be a mixed gas containing a plurality of types of gases, may be a mixed liquid containing a plurality of types of liquids, or may be a gas-liquid two-phase fluid containing both a gas and a liquid.

The mixed substance contains at least one of, for example, hydrogen ($H_2$), helium (He), nitrogen ($N_2$), oxygen ($O_2$), water ($H_2O$), water vapor ($H_2O$), carbon monoxide (CO), carbon dioxide ($CO_2$), nitrogen oxide, ammonia ($NH_3$), sulfur oxide, hydrogen sulfide ($H_2S$), sulfur fluoride, mercury (Hg), arsine ($AsH_3$), hydrogen cyanide (HCN), carbonyl sulfide (COS), C1 to C8 hydrocarbons, organic acid, alcohol, mercaptans, ester, ether, ketone, and aldehyde.

The nitrogen oxide is a compound of nitrogen and oxygen. The above-described nitrogen oxide is, for example, a gas called $NO_x$ such as nitric oxide (NO), nitrogen dioxide ($NO_2$), nitrous oxide (also referred to as dinitrogen monoxide) ($N_2O$), dinitrogen trioxide ($N_2O_3$), dinitrogen tetroxide ($N_2O_4$), dinitrogen pentoxide ($N_2O_5$), or the like.

The sulfur oxide is a compound of sulfur and oxygen. The above-described sulfur oxide is, for example, a gas called $SO_x$ such as sulfur dioxide ($SO_2$), sulfur trioxide ($SO_3$), or the like.

The sulfur fluoride is a compound of fluorine and sulfur. The above-described sulfur fluoride is, for example, disulfur difluoride (F—S—S—F, S=$SF_2$), sulfur difluoride ($SF_2$), sulfur tetrafluoride ($SF_4$), sulfur hexafluoride ($SF_6$), disulfur decafluoride ($S_2F_{10}$), or the like.

The C1 to C8 hydrocarbons are hydrocarbons with not less than 1 and not more than 8 carbon atoms. The C3 to C8 hydrocarbons may be any one of a linear-chain compound, a side-chain compound, and a ring compound. Further, the C3 to C8 hydrocarbons may either be a saturated hydrocarbon (i.e., in which there is no double bond and triple bond in a molecule), or an unsaturated hydrocarbon (i.e., in which there is a double bond and/or a triple bond in a molecule). The C1 to C4 hydrocarbons are, for example, methane ($CH_4$), ethane ($C_2H_6$), ethylene ($C_2H_4$), propane ($C_3H_8$), propylene ($C_3H_6$), normal butane ($CH_3(CH_2)_2CH_3$), isobutane ($CH(CH_3)_3$), 1-butene ($CH_2$=$CHCH_2CH_3$), 2-butene ($CH_3CH$=$CHCH_3$), or isobutene ($CH_2$=$C(CH_3)_2$).

The above-described organic acid is carboxylic acid, sulfonic acid, or the like. The carboxylic acid is, for example, formic acid ($CH_2O_2$), acetic acid ($C_2H_4O_2$), oxalic acid ($C_2H_2O_4$), acrylic acid ($C_3H_4O_2$), benzoic acid ($C_6H_5COOH$), or the like. The sulfonic acid is, for example, ethanesulfonic acid ($C_2H_6O_3S$) or the like. The organic acid may either be a chain compound or a ring compound.

The above-described alcohol is, for example, methanol ($CH_3OH$), ethanol ($C_2H_5OH$), isopropanol (2-propanol)

($CH_3CH(OH)CH_3$), ethylene glycol ($CH_2(OH)CH_2(OH)$), butanol ($C_4H_9OH$), or the like.

The mercaptans are an organic compound having hydrogenated sulfur (SH) at the terminal end thereof, and are a substance also referred to as thiol or thioalcohol. The above-described mercaptans are, for example, methyl mercaptan ($CH_3SH$), ethyl mercaptan ($C_2H_5SH$), 1-propanethiol ($C_3H_7SH$), or the like.

The above-described ester is, for example, formic acid ester, acetic acid ester, or the like.

The above-described ether is, for example, dimethyl ether (($CH_3)_2O$), methyl ethyl ether ($C_2H_5OCH_3$), diethyl ether (($C_2H_5)_2O$), or the like.

The above-described ketone is, for example, acetone (($CH_3)_2CO$), methyl ethyl ketone ($C_2H_5COCH_3$), diethyl ketone (($C_2H_5)_2CO$), or the like.

The above-described aldehyde is, for example, acetaldehyde ($CH_3CHO$), propionaldehyde ($C_2H_5CHO$), butanal (butylaldehyde) ($C_3H_7CHO$), or the like.

In the following description, it is assumed that the mixed substance separated by the separation apparatus 2 is a mixed gas containing a plurality of types of gases.

The separation apparatus 2 includes the membrane complex 1, sealing parts 21, a housing 22, two sealing members 23, a supply part 26, a first collecting part 27, and a second collecting part 28. The membrane complex 1, sealing parts 21, and the sealing members 23 are accommodated in the housing 22. The supply part 26, the first collecting part 27, and the second collecting part 28 are disposed outside the housing 22 and connected to the housing 22.

The sealing parts 21 are members mounted on the both end portions of the support 11 in the longitudinal direction (i.e., left-right direction in FIG. 8) and for covering and sealing the both end faces of the support 11 in the longitudinal direction and the outer peripheral surface in the vicinity of the both end faces. The sealing parts 21 prevent the inflow and outflow of gases through the both end faces of the support 11. The sealing parts 21 are, for example, plate-like members formed of glass or resin. The material and shape of each sealing part 21 may be appropriately changed. Further, the sealing parts 21 have a plurality of openings overlapping the through holes 111 of the support 11, so that the both ends of each through hole 111 of the support 11 in the longitudinal direction are not covered by the sealing parts 21. This allows the inflow and outflow of gases or the like from these both ends into the through holes 111.

The housing 22 is a tubular member of a substantially circular cylindrical shape. The housing 22 is formed of, for example, stainless steel or carbon steel. The longitudinal direction of the housing 22 is substantially in parallel with the longitudinal direction of the membrane complex 1. A supply port 221 is provided at an end portion on one side in the longitudinal direction of the housing 22 (i.e., an end portion on the left side in FIG. 8), and a first exhaust port 222 is provided at another end portion on the other side. A second exhaust port 223 is provided on a peripheral surface of the housing 22. The supply part 26 is connected to the supply port 221. The first collecting part 27 is connected to the first exhaust port 222. The second collecting part 28 is connected to the second exhaust port 223. An internal space of the housing 22 is a sealed space that is isolated from the space around the housing 22.

The two sealing members 23 are arranged around the entire circumference between an outer peripheral surface of the membrane complex 1 and an inner peripheral surface of the housing 22 in the vicinity of both end portions of the membrane complex 1 in the longitudinal direction. Each of the sealing members 23 is a substantially annular member formed of a material that gas cannot permeate. The sealing member 23 is, for example, an O-ring formed of a flexible resin. The sealing members 23 come into close contact with the outer peripheral surface of the membrane complex 1 and the inner peripheral surface of the housing 22 around the entire circumferences thereof. In the example shown in FIG. 8, the sealing members 23 come into close contact with the outer peripheral surface of the sealing parts 21 and come into indirect contact with the outer peripheral surface of the membrane complex 1 via the sealing parts 21. The portions between the sealing members 23 and the outer peripheral surface of the membrane complex 1 and between the sealing members 23 and the inner peripheral surface of the housing 22 are sealed, and it is thereby mostly or completely impossible for gas to pass through the portions.

The supply part 26 supplies the mixed gas into the internal space of the housing 22 through the supply port 221. The supply part 26 is, for example, a blower or a pump for pumping the mixed gas toward the housing 22. The blower or the pump includes a pressure regulating part for regulating the pressure of the mixed gas to be supplied to the housing 22. The first collecting part 27 and the second collecting part 28 are each, for example, a storage container for storing the gas led out from the housing 22 or a blower or a pump for transporting the gas.

When separation of the mixed gas is performed, the above-described separation apparatus 2 is prepared to thereby prepare the membrane complex 1 (Step S31). Subsequently, the supply part 26 supplies a mixed gas containing a plurality of types of gases with different permeabilities for the polycrystalline membrane 12 into the internal space of the housing 22. For example, the main component of the mixed gas includes $CO_2$ and $CH_4$. The mixed gas may contain any gas other than $CO_2$ and $CH_4$. The pressure (i.e., introduction pressure) of the mixed gas to be supplied into the internal space of the housing 22 from the supply part 26 is, for example, 0.1 MPa to 20.0 MPa. The temperature for separation of the mixed gas is, for example, 10° C. to 150° C.

The mixed gas supplied from the supply part 26 into the housing 22 is introduced from the left end of the membrane complex 1 in the drawing into the inside of each through hole 111 of the support 11 as indicated by an arrow 251. Gas with high permeability (which is, for example, $CO_2$, and hereinafter is referred to as a "high permeability substance") in the mixed gas permeates the polycrystalline membrane 12 provided on the inner peripheral surface of each through hole 111 and the support 11, and is led out from the outer peripheral surface of the support 11. The high permeability substance is thereby separated from gas with low permeability (which is, for example, $CH_4$, and hereinafter is referred to as a "low permeability substance") in the mixed gas (Step S32). The gas (hereinafter, referred to as a "permeate substance") led out from the outer peripheral surface of the support 11 is collected by the second collecting part 28 through the second exhaust port 223 as indicated by an arrow 253. The pressure (i.e., permeation pressure) of the gas to be collected by the second collecting part 28 through the second exhaust port 223 is, for example, about 1 atmospheric pressure (0.101 MPa).

Further, in the mixed gas, gas (hereinafter, referred to as a "non-permeate substance") other than the gas which has permeated the polycrystalline membrane 12 and the support 11 passes through each through hole 111 of the support 11 from the left side to the right side in the drawing and is collected by the first collecting part 27 through the first exhaust port 222 as indicated by an arrow 252. The pressure of the gas to be collected by the first collecting part 27 through the first exhaust port 222 is, for example, substantially the same as the introduction pressure. The non-permeate substance may include a high permeability substance that has not permeated the polycrystalline membrane 12, as well as the above-described low permeability substance.

In the crystalline material and the membrane complex 1 described above, various modifications can be made.

The crystalline material having the powder X-ray diffraction peaks shown in Table 2 may be produced from substances other than SAT-type zeolite.

The membrane complex 1 may further include a function layer or a protective layer laminated on the polycrystalline membrane 12, additionally to the support 11 and the polycrystalline membrane 12. Such a function layer or a protective layer may be an inorganic membrane such as a zeolite membrane, a silica membrane, a carbon membrane, or the like or an organic membrane such as a polyimide membrane, a silicone membrane, or the like. Further, a substance that is easy to adsorb specific molecules such as $CO_2$ or the like may be added to the function layer or the protective layer laminated on the polycrystalline membrane 12.

As the membrane of the membrane complex 1, other than the polycrystalline membrane 12 composed of the present crystalline material, a membrane produced by dispersing particles of the present crystalline material in a membrane such as an organic membrane, or a membrane produced by mixing particles of the present crystalline material and an organic substance, an inorganic substance, or the like and forming the mixture in a membrane-like form may be used. As described above, the membrane provided on the support 11 has only to contain the present crystalline material.

In the separation apparatus 2 including the membrane complex 1, any substance other than the substances exemplarily shown in the above description may be separated from the mixed substance.

The configurations in the above-discussed preferred embodiment and variations may be combined as appropriate only if those do not conflict with one another.

While the invention has been shown and described in detail, the foregoing description is in all aspects illustrative and not restrictive. It is therefore understood that numerous modifications and variations can be devised without departing from the scope of the invention.

INDUSTRIAL APPLICABILITY

The crystalline material of the present invention can be used for various applications other than the membrane complex. The membrane complex can be used as, for example, a gas separation membrane, and can be further used in various fields, as a separation membrane for any substance other than gas, an adsorption membrane for various substances, or the like.

REFERENCE SIGNS LIST

1 Membrane complex
11 Support
12 Polycrystalline membrane

The invention claimed is:

1. A crystalline material,
containing oxygen, aluminum and phosphorus, and
having the following powder X-ray diffraction peaks:

| 2 θ (°) | d (nm) | Relative Intensity |
|---|---|---|
| 8.65 ± 0.2 | 1.022 | 1-15 |
| 9.99 ± 0.2 | 0.885 | 1-15 |
| 14.17 ± 0.2 | 0.625 | 100 |
| 16.52 ± 0.2 | 0.537 | 5-80 |
| 17.37 ± 0.2 | 0.511 | 1-15 |
| 21.81 ± 0.2 | 0.407 | 10-80 |
| 22.44 ± 0.2 | 0.396 | 2-15 |
| 24.66 ± 0.2 | 0.361 | 15-70 |
| 26.11 ± 0.2 | 0.341 | 10-80 |
| 28.56 ± 0.2 | 0.313 | 5-40 |
| 29.80 ± 0.2 | 0.300 | 3-30 |
| 33.17 ± 0.3 | 0.270 | 1-20 |
| 34.93 ± 0.3 | 0.257 | 1-15 |
| 36.21 ± 0.3 | 0.248 | 2-15 |
| 39.02 ± 0.3 | 0.231 | 1-10 |
| 43.44 ± 0.3 | 0.208 | 1-10. |

2. The crystalline material according to claim 1, being powder having an average particle diameter of 0.01 to 10 μm.

3. The crystalline material according to claim 1, containing no structure-directing agent.

4. The crystalline material according to claim 1, further containing at least one of silicon, magnesium, zinc, titanium, cobalt, copper, iron and boron.

5. A membrane complex, comprising:
a support; and
a membrane containing the crystalline material according to claim 1, and provided on said support.

* * * * *